United States Patent

Eastman

[15] 3,661,539
[45] May 9, 1972

[54] TRACK CHAIN INSTALLATION TOOL

[72] Inventor: Richard D. Eastman, Eureka, Ill.

[73] Assignee: Caterpillar Tractor Co., Peoria, Ill.

[22] Filed: Apr. 9, 1970

[21] Appl. No.: 26,853

[52] U.S. Cl..............................................................29/270
[51] Int. Cl........................................................B25b 27/22
[58] Field of Search.............29/240, 283, 243.5, 270, 200 H, 29/148.3; 74/247; 305/60

[56] References Cited

UNITED STATES PATENTS 1,336,369  4/1920  Muffly...................................152/231

FOREIGN PATENTS OR APPLICATIONS 375,359  6/1932  Great Britain..........................305/60

Primary Examiner—Andrew R. Juhasz
Assistant Examiner—Michael Koczo, Jr.
Attorney—Fryer, Tjensvold, Feix, Phillips & Lempio

[57] ABSTRACT

A track chain installation tool has two bar elements adjustably connected to each other by a flexible member so that one of the bar elements may be releasably secured to a track chain and the other bar element may be releasably secured to a driven sprocket wheel whereby driving of the sprocket wheel causes the track chain to properly engage with and wrap around the sprocket wheel.

17 Claims, 3 Drawing Figures

PATENTED MAY 9 1972
3,661,539
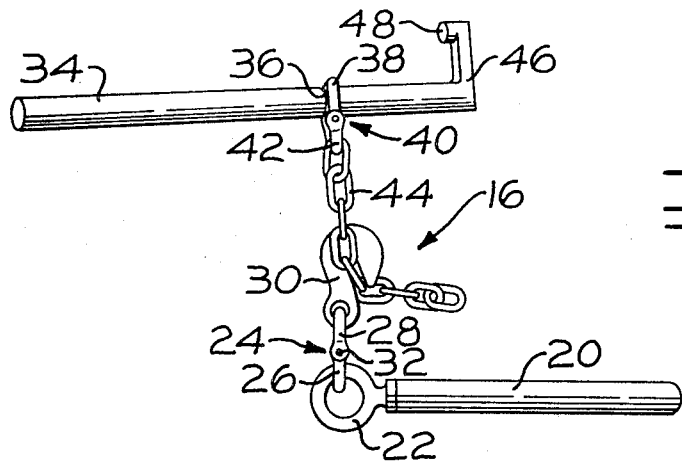
Fig_1_
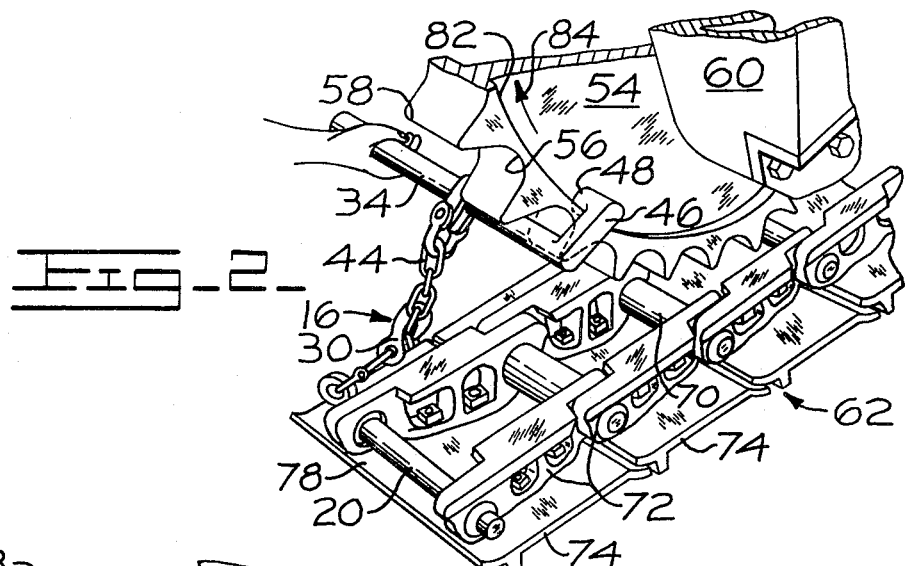
Fig_2_
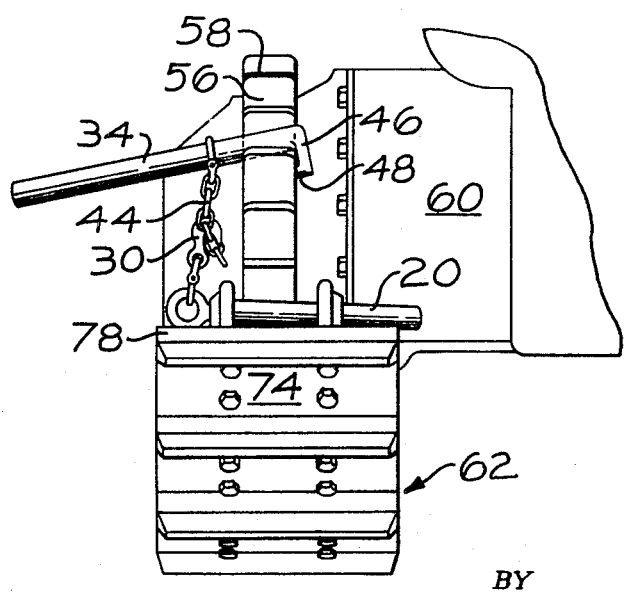
Fig_3_
INVENTOR
RICHARD D. EASTMAN
BY
Fryer, Fitzgerald, Hirt, Phillips & Lempio
ATTORNEYS

3,661,539

TRACK CHAIN INSTALLATION TOOL

BACKGROUND OF THE INVENTION

This invention relates to a track chain installation tool for use in installing a track chain on a track-type vehicle such as a crawler tractor. More particularly, the invention relates to a track chain installation tool which permits the track chain to be installed on a driven sprocket wheel at a field or job location wherein limited personnel and equipment are available.

Installing a track chain on a driven sprocket wheel of a vehicle such as a crawler tractor at a field location is often a difficult, time-consuming, as well as hazardous operation. Existing tools which are used in such an operation can be hazardous to unskilled operators, who are often injured when trying to lift or otherwise engage the heavy track onto the sprocket wheel of a track-type vehicle.

The principal object of the present invention is the provision of a single tool which is of simple construction and provides a means for safe and efficient installation of a track chain onto a driven sprocket wheel.

A further object of the invention is the provision of a single tool for installing a track chain on the driven sprocket of a track-type vehicle wherein as few as two operators can install the chain on the sprocket in a short period of time and without subjecting the operators to any unusual risks.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 1 is a perspective view of a two-bar tool which is utilized to form a temporary connection between a sprocket wheel and one end of a track chain;

FIG. 2 is a fragmentary perspective view illustrating the manner in which the track chain installation tool of the present invention is utilized to make a temporary connection between a first end of a track chain and the sprocket wheel of a track-type vehicle; and FIG. 3 is an end view illustrating the manner in which the tool of the present invention is utilized to cause the first end of the track chain to wrap around and securely engage the sprocket of the vehicle as the sprocket is rotated in a forward direction.

DESCRIPTION OF THE PREFERRED EMBODIMENT

FIG. 1 illustrates a two-bar track chain installation tool 16 used in installing a track chain on a track-type vehicle such as a crawler tractor. The tool 16 comprises a first bar element 20 which is preferably of circular configuration. One end of the bar element 20 is provided with an eye 22.

A two-part link assembly 24 has a first portion 26 connected to the eye 22 and a second portion 28 connected through a hole formed in a hook member 30. The two portions 26 and 28 of the link 24 are pivotally joined to each other by means of a pin shown at 32.

The two-bar tools 16 further comprise a second bar element 34. The bar element 34 is provided with a groove 36 which receives one portion 38 of a two-part link assembly 40 which is substantially identical to the link assembly 24. A second portion 42 of the link assembly 40 is connected to a flexible chain 44.

It may be observed from FIG. 1 that the distance between the bar elements 20 and 34 may be adjusted by engaging the hook 30 with various ones of the link elements comprising the chain 44. At this point in the description, it should be understood that various forms of adjustable flexible connections could be used to connect the bar elements 20 and 34 to each other. For example, a flexible chain or cable having a turnbuckle, or other suitable adjuster element incorporated therewith, could be used to connect the bar elements 20 and 34 to each other.

The second bar element 34 is further provided at one end with a generally perpendicularly extending catch 46. The outer end of the catch 46 is provided with a finger element 48 for a purpose which will be better understood at a later point in the description. At this juncture, it is sufficient to note that the longitudinal distance between the catch 46 and the point of attachment of the chain 44 to the bar element 34 should preferably be at least equal to the width of a sprocket 54 as shown in FIG. 2.

FIG. 2 illustrates a rear portion of the frame 60 of a track-type vehicle, such as a crawler tractor, which has been driven onto a conventional track chain shown generally at 62. The tractor comprises a driven sprocket wheel 54 having a plurality of notches 56 and sprocket teeth 58 which engage one or more track pin connections 70 which form articulated joints between a series of track link elements 72 having track shoes 74 connected to the bottoms thereof.

After the tractor has been driven onto the track chain 62 or the track chain otherwise placed in a position beneath the sprocket wheel 54, as shown in FIG. 2, an operator uses the two-bar tool 16 to form a temporary connection between a first end 78 of the track 62 and the sprocket wheel. This connection is accomplished by passing the first bar element 20 through aligned track pin bores formed in each of a pair of track link elements 72 located at the first end 78 of the chain. The second bar element 34 is then engaged with the sprocket wheel 54 in a manner such that the bar 34 extends through a sprocket notch 56 and the finger 48 of the catch 46 engages a flanged portion 82 of the sprocket. The hook 30 is then adjusted with respect to the chain 44 so that the chain is taut when the bar elements 20 and 34 are in their engaged position and substantially parallel to each other.

After the two-bar tool 16 has been properly positioned, an operator holds the second bar element 34 in the position shown in FIG. 2 and the sprocket wheel 54 is driven in the direction of arrow 84 which causes the first end 78 of the track to wrap around the sprocket as shown in FIG. 3.

It should be understood that the continued driving of the sprocket wheel 54 from the position shown in FIG. 3 will move the first end 78 of the track chain to a location which is somewhat beyond an over-center position with respect to the sprocket. Once the first end 78 of the track chain reaches such an over-center position, the two-bar tool 16 may be removed, since the weight of the chain will be sufficient to cause proper engagement of the sprocket teeth and notches with the pin connections 70 which pivotally connect the chain links 72 to each other.

While I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

What is claimed is:

1. A tool for the installation of an elongated, flexible track chain upon a sprocket wheel having a plurality of notches, said flexible chain having a plurality of links therein which links are each provided with a pair of axially aligned holes at each end for receiving a pin element which is used to secure said links together, said tool comprising; a first elongated bar element adapted to be received within said holes in each of said links, a second elongated bar element having sprocket notch engaging means for grippingly engaging a notch and a further portion of said sprocket wheel, and flexible means interconnecting a first end portion of said first elongated bar element with a portion of said second elongated bar element which portion is longitudinally spaced away from said sprocket notch engaging means of said second elongated bar element such that said flexible means does not contact said sprocket wheel.

2. A tool as set forth in claim 1 wherein said flexible means is provided with adjustable means for adjusting the length of the flexible means.

3. A tool as set forth in claim 1 wherein the flexible means comprises a linked chain.

4. A tool as set forth in claim 3 wherein said linked chain has two separate portions and wherein one of said portions has a hook member connected thereto, which hook member selectively adjustably connects to the other of said two separate portions of said linked chain.

5. A tool as set forth in claim 4 wherein the chain portion with the hook member is associated with said first end portion of said first elongated bar element.

6. A tool as set forth in claim 1 wherein said sprocket notch engaging means comprises a catch means attached to and extending generally perpendicularly from said second elongated bar element, said catch means having a finger portion at its distal end for engaging said further portion of said sprocket wheel.

7. A tool as set forth in claim 6 wherein said flexible means is provided with adjustable means for adjusting the length thereof.

8. A tool as set forth in claim 7 wherein said flexible means comprises a linked chain.

9. A tool as set forth in claim 8 wherein one of said elongated bar elements has a hook member associated therewith for selectively engaging one of the chain links associated with the other of said elongated bar elements for adjusting the length of the flexible means therebetween.

10. A tool for the installation of an elongated, flexible chain upon a notched sprocket wheel, said chain having a plurality of links which are provided with axially aligned holes at each end thereof for receiving a pin element used to secure the links to each other, said tool comprising; a first elongated bar element adapted to be inserted into the holes of said links, a second elongated bar element having sprocket wheel engaging means for grippingly engaging a portion of the sprocket wheel, and flexible means interconnecting a first end portion of said first elongated bar element with the second elongated bar element in a manner such that when said elongated bar elements are disposed parallel to each other and said flexible means is disposed normally to each of said elongated bar elements said first end portion is laterally offset from said sprocket wheel engaging means of said second elongated bar element by a distance at least equal to the width of said sprocket wheel.

11. A tool as set forth in claim 10 wherein said flexible means is provided with adjustment means for varying the length of said flexible means.

12. A tool as set forth in claim 10 wherein the flexible means comprises a linked chain.

13. A tool as set forth in claim 12 wherein one of said elongated bar elements has a hook member attached thereto for selectively engaging a chain link associated with the other said elongated bar element for adjusting the length of said linked chain.

14. A tool as set forth in claim 13 wherein said hook member is associated with said first end of said first elongated bar element.

15. A tool as set forth in claim 10 wherein the sprocket wheel engaging means comprises a catch means extending generally normally from said second elongated bar element, said catch means having a finger element at its distal end for engaging the sprocket wheel.

16. A tool as set forth in claim 15 wherein said flexible mans comprises a linked chain which is provided with adjustable means for adjusting the length thereof.

17. A tool as set forth in claim 16 wherein one of said elongated bar elements has a hook member associated therewith for selectively engaging one of the chain links associated with the other of said elongated bar elements for adjusting the length of the flexible means.

* * * * *